(12) United States Patent  
Lemon (10) Patent No.: US 6,684,813 B1
(45) Date of Patent: Feb. 3, 2004

(54) BIRDBATH ASSEMBLY AND METHOD

(76) Inventor: Barbara L. Lemon, 624 Claridge Ct., Hoffman Estates, IL (US) 60195

( * ) Notice: Subject to any disclaimer, the term of this patent is extended or adjusted under 35 U.S.C. 154(b) by 0 days.

(21) Appl. No.: 10/429,145

(22) Filed: May 3, 2003

(51) Int. Cl.[7] .......................... A01K 45/00; B05B 17/08
(52) U.S. Cl. ........................................ 119/69.5; 239/20
(58) Field of Search ........................... 119/69.5, 72, 74; 239/16, 17, 20, 22; D30/121; D23/201

(56) References Cited

U.S. PATENT DOCUMENTS

| 151,003 A | * | 5/1874 | Briesen ..................... 239/22 |
|---|---|---|---|
| 1,112,971 A | | 10/1914 | Bower |
| 1,354,113 A | | 9/1920 | Leverett |
| D60,912 S | | 4/1922 | Lyon |
| 1,806,123 A | | 5/1931 | Smith |
| D87,364 S | | 7/1932 | Spindler |
| 1,962,840 A | | 6/1934 | Rives |
| D120,005 S | | 4/1940 | Gautschi |
| 2,878,781 A | | 3/1959 | Wingfield |
| 3,008,646 A | * | 11/1961 | Benak ......................... 239/20 |
| 3,084,666 A | | 4/1963 | Plaisance |
| 3,841,268 A | | 10/1974 | Bunger |
| 3,995,591 A | | 12/1976 | Garwood |
| 4,630,569 A | | 12/1986 | Dieleman |
| 4,640,226 A | | 2/1987 | Liff |
| 5,692,454 A | | 12/1997 | Testa |
| 5,743,212 A | | 4/1998 | Forjohn |
| 5,775,586 A | * | 7/1998 | Hamilton-Bruzzi et al. .. 239/20 |
| 5,782,035 A | | 7/1998 | Locke et al. |
| 5,931,118 A | | 8/1999 | Thompson |
| 5,966,868 A | | 10/1999 | Cox |
| 6,079,951 A | | 6/2000 | Morton |
| 6,484,666 B1 | | 11/2002 | Reusche |
| 6,634,316 B2 | * | 10/2003 | Desatoff ..................... 119/69.5 |
| 2002/0117554 A1 | * | 8/2002 | Lin ............................. 239/17 |

* cited by examiner

Primary Examiner—Charles T. Jordan
Assistant Examiner—Elizabeth Shaw
(74) Attorney, Agent, or Firm—Christopher J. Scott; Meroni & Meroni, P.C.; Charles F. Meroni, Jr.

(57) ABSTRACT

The present invention provides a maintenance-efficient birdbath—fountain assembly essentially comprising an upper annular basin, a lower support reservoir, a fountain assembly, and a decorative cap. The basin comprises a central water dam and a sloped superior surface. The water dam comprises a plurality of water retainers and a plurality of water inlet grooves intermediate the water retainers, which together define a reservoir access aperture. The support reservoir supports the basin and receives excess water emptying from the basin via the water inlet grooves. The fountain assembly comprises a pump assembly and a float valve assembly for recirculating water and for maintaining a desired water level. The decorative cap caps the reservoir access aperture, which allows a user to manually access the fountain assembly or the reservoir without removing the basin from the reservoir thus providing the user with an efficiently maintained birdbath—fountain assembly.

35 Claims, 4 Drawing Sheets

BIRDBATH ASSEMBLY AND METHOD

BACKGROUND OF THE INVENTION

1. Field of the Invention

The present invention generally relates to a birdbath assemblage. More particularly, the present invention relates to a combination birdbath and fountain for attracting birds to the environment into which the birdbath assemblage is placed, which combination birdbath and fountain comprises improved structure for birdbath and fountain component maintenance.

2. Description of the Prior Art

The study of birds is formally referred to as ornithology and within the broad compass of ornithologists is found a remarkable array of bird enthusiasts. They range from the person who notices which bird species visit the garden birdbath, to the shivering scientist recording the courtship behavior of a throng of Antarctic Adélie Penguins, to the computer buff trying to mathematically describe the fate of some host population subject to the parasitic attentions of cowbirds or cuckoos. To be sure, bird enthusiasts are well-numbered and these numbers continue to grow. Accordingly, markets continue to develop in an effort to cater to the growing needs and desires of the bird enthusiast population. In this last regard, it is noted that there are two avenues by which the typical bird lover or ornithologist pursues his or her study of birds. Either the bird enthusiast will travel to the ecosystem in which the various bird species live or the bird enthusiast will attempt to lure or attract various bird species to the "ecosystem" in which the bird enthusiast lives. It is with this latter trend in mind that the present invention is proposed. In other words, a growing desire among bird enthusiasts or bird watchers is to attract various species of birds to the vicinity of the residential abode or similar other setting in which the watcher spends a considerable amount of time.

The most successful way of attracting birds and increasing their number in a given setting is to satisfy their most basic needs—good food, nesting sites and water. In this regard, the birdbath is useful in any attempt to attract birds to a given setting, because water is as vital to birds as food. It is particularly important for seed-eating and fruit-eating birds. Birds will come to a birdbath throughout the year, both to drink and to bathe. Bathing helps maintain plumage in good condition and in hot weather, keeps birds cool. It is thus observed that a simple and effective means of attracting birds to a given residential setting or other similar-type setting is through the installation of a birdbath structure, which has been noted in the various prior art publications, including U.S. Pat. Nos. 1,806,123; 6,079,051; and 6,484, 666. It is further noted that there is a wide range of birdbaths on the market, some of which are more ornamental than practical. Still further, it is noted that the prior art teaches a great variety of birdbaths, in general, and combination birdbath—fountains, in particular. Some of the more pertinent prior art relating to birdbaths and combination birdbath—fountains and the like is described hereinafter.

U.S. Pat. No. 1,354,113 ('113 patent), which issued to Leverett, discloses a Birdbath. The '113 patent teaches a combination birdbath and fountain. The combination birdbath and fountain comprises a mina pedestal having a broad base and a water supply pipe. A basin rests atop the main pedestal. A cylindrical chamber enlarged at its upper end and comprising a plurality of perforations at the bottom end rests atop the basin. The chamber may be integrally formed with the basin or may rest atop the basin under its own weight. A plate is adapted to rest atop the chamber, which plate may carry a sundial or any other ornament. Thus, the Birdbath of the '113 patent comprises an open chamber, the sides whereof are perforated, with a fountain adapted to deliver water within the chamber, means for supplying water to said fountain, and a cover for the chamber adapted to obstruct the play of said fountain.

U.S. Pat. No. 1,806,123 ('123 patent), which issued to Smith, also discloses a Birdbath. The '123 patent teaches a birdbath structure comprising the combination of a vertically disposed hollow column and a removable water pan having a centrally located receptacle positionable atop the hollow column. The receptacle extends below the bottom surface of the water pan and is adapted to be received by said hollow column. The receptacle is surrounded by integral walls extending upwardly from the upper surface of said water pan. Further, a plurality of integral partitions extends upwardly, which partitions are disposed around the periphery of said water pan. The partitions thus form receptacles for the reception of materials such as bird food.

U.S. Pat. No. 2,878,781 ('781 patent), which issued to Wingfield, discloses a Bath Installation, in Particular for Birds. The '781 patent teaches a combination birdbath and fountain, which combination comprises a water container and tubular means supporting the water container. Conduit means are located inside the tubular supporting means and extend thereabove for constantly supplying water to the container. The conduit thus has an outlet at its upper end. The outlet is normally disposed above the level of the water in the water container. The tubular supporting means also serves as the medium for exhausting the water from the container. Upwardly opening drawing means are located at the upper end of the tubular supporting means above the bottom of the container and below the outlet of the conduit means. The water container is vertically adjustable and sealingly mounted on the tubular supporting means to vary the elevation of drain means relative to the bottom of the container whereby the level of the water in the container may be regulated and hose means secured to the conduit means.

U.S. Pat. No. 3,084,666, which issued to Plaisance, discloses a Combination Birdbath and Plant Receptacle Support. U.S. Pat. No. 3,084,666 teaches a birdbath comprising a tubular pedestal of generally circular horizontal section open at both ends and including an externally reduced, substantially cylindrical upper end portion. The upper end portion provides a generally horizontal, upwardly facing circumferential shoulder. A closure in the form of a flower pot comprising an enlarged, cylindrical support portion provides a horizontal, downwardly facing circumferential shoulder seated in the top of the pedestal for telescopically suspending the flower pot therein. Further, a circular saucer, for the reception of water, is mounted on the pedestal and includes a central hub telescopically receiving the reduced upper portion of said pedestal and is generally flush with the top thereof and rests on the first-named shoulder. The upper pedestal portion and the hub are cylindrical whereby the saucer is rotatably adjustable relative to the flower pot, removable from the pedestal and invertable thereon.

U.S. Pat. No. 5,931,118 ('118 patent), which issued to Thompson, discloses a Self-Filling Birdbath System. The '118 patent teaches a self-filling birdbath system for utilizing rainwater collected within a conventional rain gutter system to fill and clean a birdbath. The devices includes a birdbath, a collection tube connectable to a drain spout of a rain gutter, a elbow tube coupled with the collection tube, a transporting tube coupled to the elbow tube opposite of the collection tube, and a fill tube coupled to the transporting tube and extending through the birdbath above the rim of the basin. Rainwater is accumulated within the rain gutter and is drained through the drain spout. The rainwater is then forced through the transporting tube through the fill tube and out a dispensing end where the water is dispensed into an animal access basin.

U.S. Pat. No. 6,079,951 ('951 patent), which issued to Morton, discloses a Birdbath Fountain. The '951 patent teaches an animal watering system, such as a birdbath, incorporating a water reservoir, a means to automatically maintain the level of water in the reservoir by admitting fresh water thereto, an animal access basin positioned above the water reservoir whereby water overflowing the basin enters the reservoir, an air lift pump for transporting water from the reservoir to the basin by way of a fountain head and fountain catch basin, and an air compressor for providing a source of compressed air to operate the lift pump.

U.S. Pat. No. 6,484,666, which issued to Reusche, discloses a Birdbath. U.S. Pat. No. 6,484,666 teaches a birdbath comprising a birdbath basin adapted to hold water, a base adapted to support the basin, a water reservoir contained within the base, an electrically operated pump contained within the base, and a mechanism, such as a timer or photocell, for controlling operation of the pump. The pump has an inlet in fluid communication with the reservoir and an outlet in fluid communication with the flow opening positioned in the lowest part of the base. When the pump is operating it pumps water from the reservoir, through the flow opening, and into the basin. When the pump is not operating, water in the basin drains under gravity. flow through the flow opening, through the pump and into the reservoir. As a result, the basin may be automatically filled and drained at selected times during the day.

From a review of these patents and other prior art generally known in the relevant art, it will be seen that the prior art does not teach a maintenance-efficient birdbath—fountain assembly for enabling a user to allure birds to a desired location. In this regard, it is noted that combination birdbath and fountain assemblies require occasional to frequent maintenance to clean various bath components or to clean or repair various fountain components. This is particularly true given the observation that bathing birds tend to deposit relatively large amounts of litter in the bath water.

Typically, fountain components or bath components are often designed to be housed in a basin-supporting pedestal structure. To gain access to the various components for maintenance, it is thus often necessary to remove the basin structure from the basin-supporting pedestal. Since the bath structure or basin structure is typically filled with water in varying amounts, the water in such cases must often be directed away from the maintenance personnel in order to avoid soaking. Further, the bath or basin structure must often be physically removed from the bath or basin supporting pedestal, thus creating the risk of damage to the basin structure, which is often constructed from materials that may easily be broken.

It will thus be seen that the prior art does not teach a self-filling, combination birdbath—fountain assembly which may be easily maintained without the need for removing the basin structure from the basin-supporting pedestal. Specifically, it will be seen that the prior art does not teach a birdbath—fountain assembly that essentially comprises a basin, a reservoir, a fountain assembly and a decorative cap, which together provide an efficiently maintainable birdbath—fountain assemblage.

In this regard, the prior art does not teach a basin that essentially comprises a superior basin perimeter, a hollow central basin pedestal, a sloped superior basin surface, and an inferior basin surface wherein the sloped superior basin surface is intermediate the superior basin perimeter and the hollow central basin pedestal; wherein the hollow central basin pedestal comprises a cap support end and a basin-engaging end; wherein the basin-engaging end is integrally formed with the sloped superior basin surface; wherein the cap support end comprises a plurality of upwardly extending equally-spaced support members and a plurality of water inlet grooves intermediate the support members; wherein the support members each have a cap-engaging surface; wherein the cap-engaging surfaces are substantially coplanar; and wherein the support members and water inlet grooves define a reservoir access aperture.

Further, it will be further seen that the prior art does not teach a reservoir that comprises a superior reservoir perimeter and an inferior reservoir base wherein the inferior basin surface of the basin may be seated atop the superior reservoir perimeter; wherein the inferior reservoir base comprises an inferior reservoir perimeter, a superior base surface, an inferior base surface and at least one conduit aperture; wherein the conduit aperture extends through the superior base surface and the inferior base surface; wherein the inferior base surface has an infrabasal notch; wherein the infrabasal notch extends from the conduit aperture to the inferior reservoir perimeter; and wherein the infrabasal notch provides basal conduit means.

Further, it will be seen that the prior art does not teach a fountain assembly that comprises a pump assembly, a float valve assembly, and a substantially vertical conduit member wherein the pump assembly comprises a pump housing, upwardly extending fountain tubing, and electrical power delivery means; wherein the fountain tubing comprising a water inlet end and a water outlet end; wherein the water inlet end is cooperatively associated with the pump housing; wherein the float valve assembly comprises a float valve, valve control means, and float tubing; wherein the float valve and valve control means operate to control water outlet from the float tubing; wherein the conduit member comprises a superior conduit end and an inferior conduit end; wherein the inferior conduit end is inserted in the conduit aperture and forms a water tight seal therebetween; wherein the float tubing exist the reservoir via the conduit member and basal conduit means and is selectively connected to a water supply; and wherein the electrical power delivery means exits the reservoir via the conduit member and basal conduit means and is selectively connected to an electrical power supply.

Further, it will be seen that the prior art does not teach a decorative cap that comprises a superior cap surface, an inferior cap surface and a water outlet conduit wherein the inferior cap surface is substantially planar for seated engagement with the cap-engaging surfaces; wherein the water outlet conduit is in fluid communication with the water outlet end and extends through the inferior cap surface and the superior cap surface; wherein the reservoir access aperture is sized and shaped to allow a user to manually access the fountain assembly without removing the basin from the reservoir; and wherein the reservoir access aperture provides means for efficiently maintaining the birdbath—fountain assembly.

Of the birdbaths and combination birdbaths that have been developed, none provide a birdbath assemblage having means for gaining access to an inner reservoir of a pedestal, which pedestal both supports a basin and houses a fountain assembly. None of the prior art provides a birdbath assemblage that further provides means for continually refilling the water level in the birdbath basin while simultaneously providing a decorative statuary effect. Indeed, it has been shown that birdbaths and combination birdbaths are known in the prior art. However, in addition to often being exorbitantly priced, the birdbaths that have been developed are often cumbersome to practice and maintain.

The prior art thus perceives a need for a maintenance-efficient birdbath—fountain assembly for enabling a user to allure birds to a desired location. In this regard it is noted that the prior art perceives a need for combination birdbath and fountain assembly which does not require the user to remove the bath structure or basin structure from the bath-supporting or basin-supporting pedestal in order to gain access to fountain components or the pedestal reservoir. Further, the prior art perceives a need for a birdbath and fountain assembly which simultaneously provides means for continually refilling the water level in the birdbath basin and a decorative statuary effect. Specifically, the prior art perceives a need for a birdbath—fountain assembly that essentially comprises a basin, a reservoir, a fountain assembly and a decorative cap, which together provide an efficiently maintainable birdbath and fountain assemblage as described in more detail hereinafter.

SUMMARY OF THE INVENTION

Accordingly, it is an object of the present invention to provide a maintenance-efficient birdbath—fountain assembly for enabling a user to allure birds to a desired location. In this regard, it is an object of the present invention to provide a combination birdbath and fountain assembly that does not require the user to remove the bath structure or basin structure from the bath-supporting or basin-supporting pedestal in order to gain access to fountain components or the pedestal reservoir. Further, it is an object of the present invention to provide a birdbath and fountain assembly which simultaneously provides means for continually refilling the water level in the birdbath basin and a decorative statuary effect. Specifically, it is an object of the present invention to provide a birdbath—fountain assembly that essentially comprises a basin, a reservoir, a fountain assembly and a decorative cap, which together provide an efficiently maintainable birdbath and fountain assemblage.

In this last regard, it is an object of the present invention to provide a basin that comprises a superior basin perimeter, a hollow central basin pedestal, a sloped superior basin surface, and an inferior basin surface wherein the sloped superior basin surface is intermediate the superior basin perimeter and the hollow central basin pedestal; wherein the hollow central basin pedestal comprises a cap support end and a basin-engaging end; wherein the basin-engaging end is integrally formed with the sloped superior basin surface; wherein the cap support end comprises a plurality of upwardly extending equally-spaced support members and a plurality of water inlet grooves intermediate the support members; wherein the support members each have a cap-engaging surface; wherein the cap-engaging surfaces are substantially coplanar; and wherein the support members and water inlet grooves define a reservoir access aperture.

Further, it is an object of the present invention to provide a reservoir that comprises a superior reservoir perimeter and an inferior reservoir base wherein the inferior basin surface of the basin may be seated atop the superior reservoir perimeter; wherein the reservoir base comprises an inferior reservoir perimeter, a superior base surface, an inferior base surface and at least one conduit aperture; wherein the conduit aperture extends through the superior base surface and the inferior base surface; wherein the inferior base surface has an infrabasal notch; wherein the infrabasal notch extends from the conduit aperture to the inferior reservoir perimeter; and wherein the infrabasal notch provides basal conduit means.

Still further, it is an object of the present invention to provide a fountain assembly that comprises a pump assembly, a float valve assembly, and a substantially vertical conduit member wherein the pump assembly comprises a pump housing, upwardly extending fountain tubing, and electrical power delivery means; wherein the fountain tubing comprising a water inlet end and a water outlet end; wherein the water inlet end is cooperatively associated with the pump housing; wherein the float valve assembly comprises a float valve, valve control means, and float tubing; wherein the float valve controls water outlet from the float tubing; wherein the conduit member comprises a superior conduit end and an inferior conduit end; wherein the inferior conduit end is inserted in the conduit aperture and forms a water tight seal therebetween; wherein the float tubing exits the reservoir via the conduit member and basal conduit means and is selectively connected to a water supply; and wherein the electrical power delivery means exits the reservoir via the conduit member and basal conduit means and is selectively connected to an electrical power supply.

Further still, it is an object of the present invention to provide a decorative cap that comprises a superior cap surface, an inferior cap surface and a water outlet conduit wherein the inferior cap surface is substantially planar for seated engagement with the cap-engaging surfaces; wherein the water outlet conduit is in fluid communication with the water outlet end and extends through the inferior cap surface and the superior cap surface; wherein the reservoir access aperture is sized and shaped to allow a user to manually access the fountain assembly without removing the basin from the reservoir; and wherein the reservoir access aperture provides means for efficiently maintaining the birdbath—fountain assembly.

To achieve these and other readily apparent objectives, the present invention provides a maintenance-efficient birdbath—fountain assembly for enabling a user to allure birds to a desired location, the birdbath—fountain assembly comprising in combination a basin, a reservoir, a fountain assembly, and a decorative cap essentially as summarized hereinabove.

Other objects of the present invention, as well as particular features, elements, and advantages thereof, will be elucidated in, or apparent from, the following description and the accompanying drawing figures.

BRIEF DESCRIPTION OF THE DRAWINGS

Other features of my invention will become more evident from a consideration of the following brief description of my patent drawings, as follows.

DETAILED DESCRIPTION OF THE PREFERRED EMBODIMENT

Figure 1:
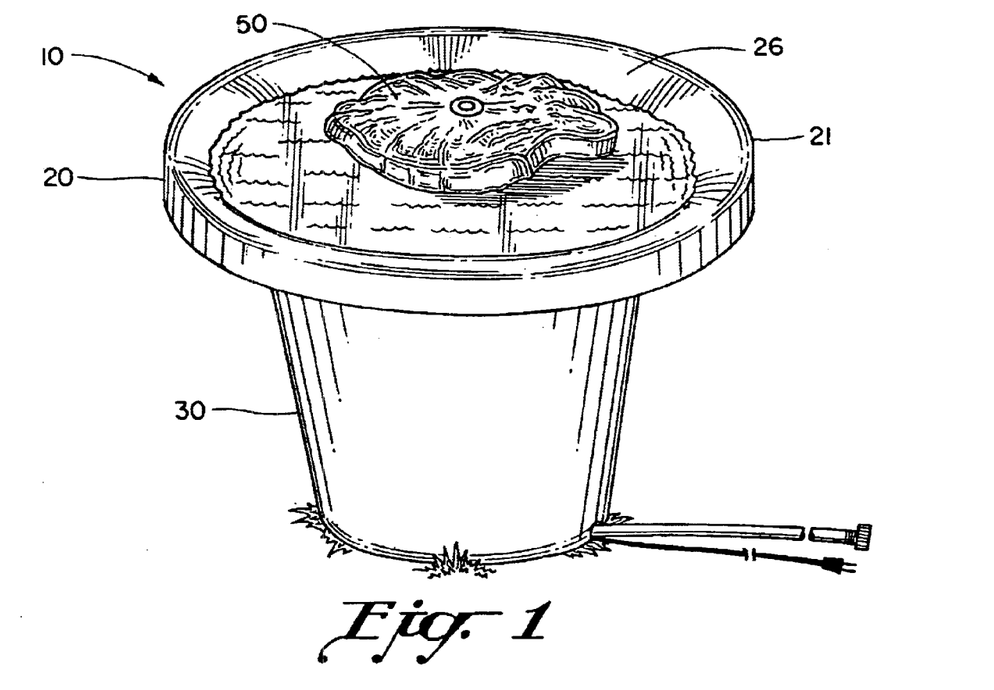
FIG. 1 is a perspective view of the birdbath—fountain assembly in an assembled stated.
Figure 8:
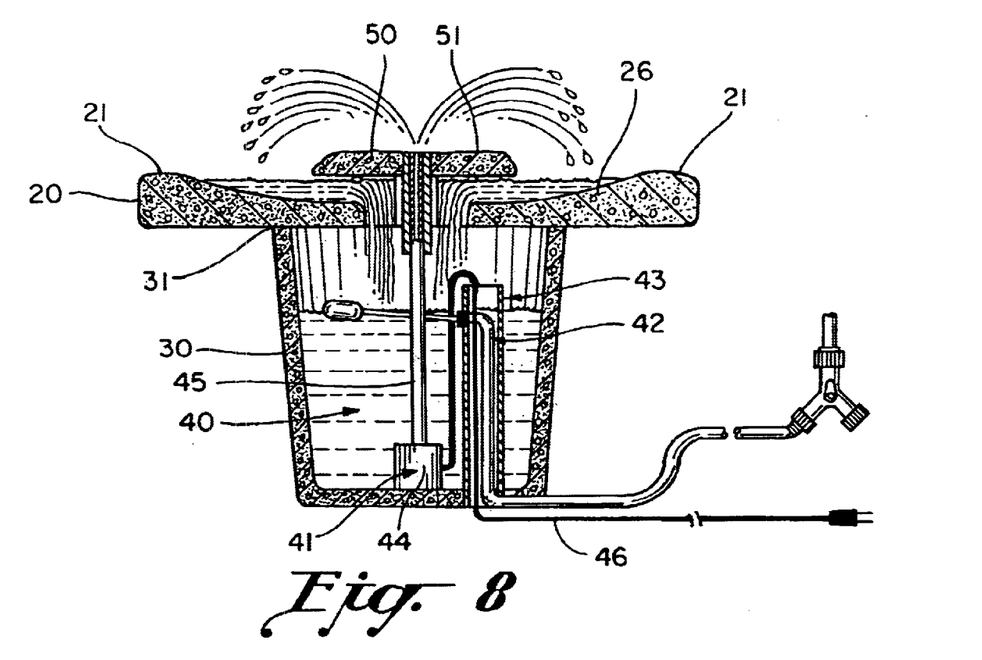
FIG. 8 is a cross-sectional side view of the birdbath—fountain assembly in an assembled stated.

Referring now to the drawings, the preferred embodiment of the present invention concerns a maintenance-efficient birdbath—fountain assembly 10 for enabling a user to allure birds to a desired location or for providing simple bathing means for birds. The maintenance-efficient birdbath—fountain assembly 10 is generally illustrated in FIGS. 1 and 8 in an assembled state. Birdbath—fountain assembly 10 essentially provides users with a means to quickly and easily access the fountain components housed in the lower reservoir as well as other components of the lower water reservoir as illustrated in FIG. 8 by means of a reservoir access aperture. The reservoir access aperture is sufficiently large to enable the user to manually reach into the reservoir with the user's arm and grasp components or otherwise tend to the lower water reservoir with the user's hand as is figuratively illustrated in FIG. 10. The upper basin structure of the birdbath structure may thus be left in its seated position atop the lower water reservoir, which greatly increases the efficiency with which a user may maintain the present invention.

Birdbath—fountain assembly 10 preferably comprises in combination an annular bath basin or an upper basin 20 as illustrated in FIGS. 1, 2, 8, 9, and 10; a bath basin support reservoir or a lower reservoir 30 as illustrated in FIGS. 1, 4, 5, 8, 9, and 10; water-replenishing means or a fountain assembly 40 as illustrated in FIG. 8; and a cap structure or preferably a decorative cap 50 as illustrated in FIGS. 1, 6, 7, and 8. It is contemplated that when in a fully assembled state as generally illustrated in FIG. 1, birdbath—fountain assembly 10 provides an aesthetically pleasing birdbath installation.

It is noted that birdbaths can be made out of practically anything—concrete, glazed ceramic, metal, plastic, terra cotta, stone, fiberglass, even wood. Plastic and metal materials are capable of withstanding extreme weather variations, but surfaces can be slippery; further, some plastics crack with age and structural metals should be rust resistant. It is thus specified that basin 20 may be also constructed from any number of materials. For example, it is contemplated that basin 20 may be constructed from concrete, fiberglass, terra cotta, ceramic materials, and the like. To keep manufacturing costs as a minimum, however, it is contemplated that the preferred materials comprise fiberglass or similar other resin. This specified material is sufficiently strong and lightweight and may be manufactured or formed inexpensively.

As illustrated, basin 20 is preferably circular in horizontal cross section and preferably comprises an overall diameter of about 27 inches in the preferred embodiment to allow room for more than one bird to bathe or congregate at a time. Given the relatively large diameter of basin 20, should the consumer desire a more massive construction, the basin component or basin 20 may become rather unwieldy. It is with this in mind that stronger, lighter materials may be preferred so the user may on occasion more easily reposition birdbath—fountain assembly 10. While it may be further evident from an inspection of the various figures that basin 20 has a vertical thickness, the thickness will depend on the materials used. In this regard, it is contemplated that the vertical thickness of basin 20 is a specification that may be left to the consumer's or manufacturer's election and is not critical to the functionality of the present invention.

Basin 20 preferably comprises a superior basin perimeter 21 as illustrated in FIGS. 1, 2, 8, 9, and 10; a central basin water dam or hollow central basin pedestal 22 as illustrated in FIGS. 2, 3, 9, and 10; a sloped bath basin surface or superior basin surface 26 as illustrated in FIGS. 1, 2, 8, 9, and 10; and an inferior basin surface 27 as generally illustrated in FIG. 8. From an inspection of the noted figures, it will be seen that sloped superior basin surface 26 is intermediate superior basin perimeter 21 and hollow central basin pedestal 22. Superior basin surface 26 is preferably sloped so as to provide concentric regions of varying water depths, the water depth of greatest magnitude being adjacent the central basin water dam or hollow central basin pedestal 22. In this regard, it is noted that a gradual transition from shallow to deeper water is preferred by birds. Further, it is contemplated that the preferred maximum water depth be approximately 1½ inches, but no greater than about 3 inches. A bird will typically not plunge into water of unknown depth, but instead will wade in until if finds a level to its liking. Since it has been observed that birds often find it difficult to judge water depth, it is often beneficial to install a flat rock or two in the center of the birdbath. This topic will be addressed in more detail below. Superior basin surface also preferably comprises a roughened surface to give birds wading into the water a foothold.

Figure 2:
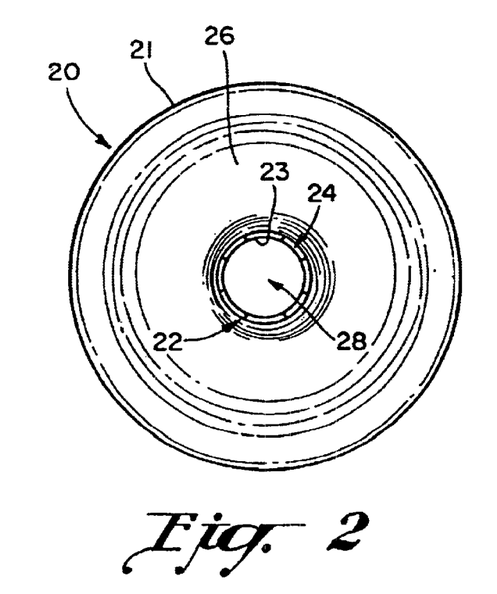
FIG. 2 is a top plan view of the basin.
Figure 3:
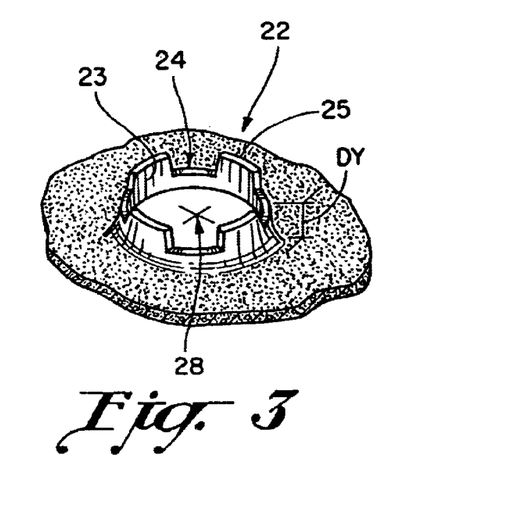
FIG. 3 is a fragmentary perspective view of the basin showing the hollow central basin pedestal.

Hollow central basin pedestal 22 preferably comprises a cap support end and a basin-engaging end. It will be understood that the basin-engaging end is preferably integrally formed with sloped superior basin surface 26 as is generally illustrated in FIG. 3. In the preferred embodiment, hollow central basin pedestal 22 also comprises a substantially circular horizontal cross section as is generally illustrated in FIG. 2, which circular cross section preferably further comprises an inner diameter with a measured magnitude of about 4 inches. The cap support end comprises a plurality of upwardly extending equally-spaced water retainers or support members 23 as illustrated in FIGS. 2, 3, 9, and 10, and a plurality of water inlet grooves 24 as illustrated in FIGS. 2, 3, 10. As may be seen from an inspection of the noted Figures, water inlet grooves are spaced intermediate support members 23.

Figure 9:
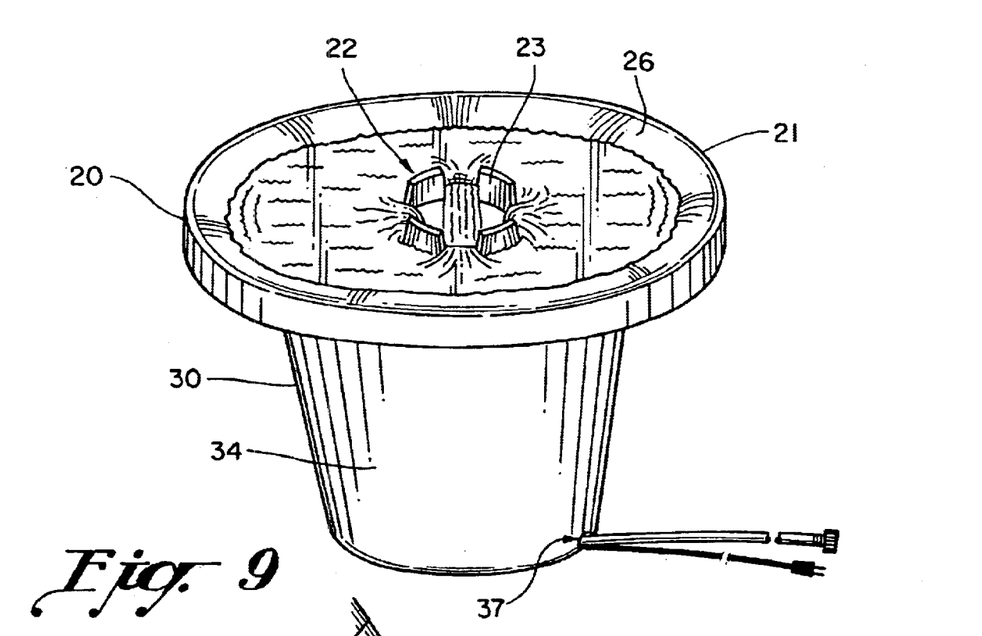
FIG. 9 is a perspective view of the birdbath—fountain assembly with the decorative cap removed to show the central basin pedestal and water inlet grooves.
Figure 10:
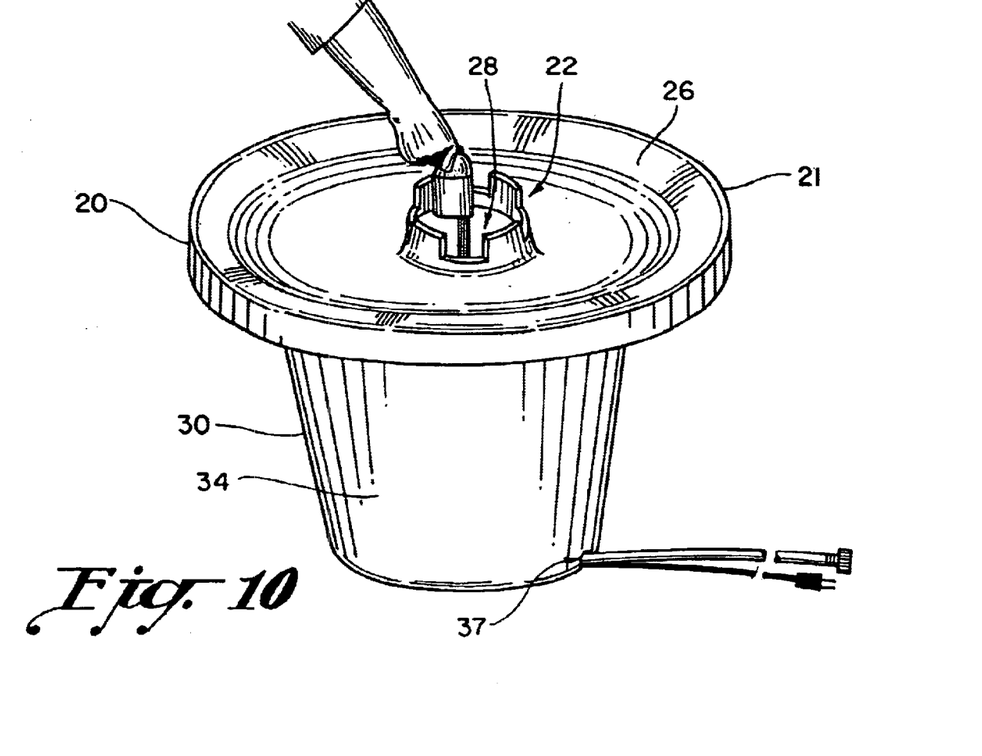
FIG. 10 is a perspective view of the birdbath—fountain assembly with the decorative cap removed to show a user manually accessing the reservoir via the reservoir access aperture.

Further, from an inspection of FIG. 9, it will be understood that water inlet grooves function to allow water to empty into the bath basin support reservoir or lower reservoir 30. The maximum water depth is thus achieved by forming water inlet grooves such that the distance from the upper groove surface to sloped superior basin surface 26 is at a maximum of about 1½ inches adjacent the central basin water dam or hollow central basin support pedestal 22 as generally illustrated in FIG. 8 and as specifically referenced at "ΔY" in FIG. 3, which Figure generally illustrates the subject structures. It will be further seen from an inspection of FIG. 3 that support members 23 each preferably comprise a cap-engaging surface 25. Cap-engaging surfaces 25 are preferably coplanar. Still further, it will be seen that support members 23 and water inlet grooves 24 together define a reservoir access aperture 28 as illustrated in FIGS. 2, 3, and 10.

As earlier discussed, birdbath—fountain assembly 10 provides users with a means to quickly and easily access the inner fountain components and the lower water reservoir, which means may preferably be defined by reservoir access aperture 28. Reservoir access aperture 28 is sufficiently large to enable the user to manually reach into the reservoir with the user's arm and grasp components or otherwise tend to the lower water reservoir with the user's hand as is figuratively illustrated in FIG. 10. Basin 20 may thus be left in its seated position atop reservoir 30, which greatly increases the efficiency with which a user may maintain the present invention. In this regard, it is noted that if the consumer is desirous of obtaining a basin 20 constructed from more massive materials such as cement or concrete, then it is greatly beneficial to have a basin 20 which may be left in place, particularly if the user is unable to lift unwieldy, weighty components. Reservoir access aperture 28 is essentially the superior terminus of hollow central basin pedestal 22 and as such preferably also comprises circular cross section, which preferably further comprises an inner diameter the measured magnitude of which is about 4 inches. It is believed that the specified inner diameter of about 4 inches is sufficiently large to enable the user to manually reach into reservoir 30 with the user's arm and grasp components or otherwise tend to reservoir 30 with the user's hand as is figuratively illustrated in FIG. 10. It is contemplated that reservoir access aperture 28 is thus sized and shaped so as to allow an adult user to manually access the reservoir with an upper appendage of his or her choosing.

In the preferred embodiment, the plurality of upwardly extending equally-spaced water retainers or support members 23 number four and the plurality of water inlet grooves 24 intermediate support members 23 number four. Each support member 23 and water inlet groove 24 thus comprises an arc length which comprises about ⅛ the circumference of the substantially circular horizontal cross-section or in other words ⅛ the circumference of reservoir access aperture 28. With a diameter of about 4 inches, the circumference of reservoir access aperture is given by about $4\pi$ inches. The preferred arc length of each support member 23 and each water inlet groove 24 thus is about $4\pi/8$ inches or $\pi/2$ inches.

As earlier noted, birdbaths can be made out various materials including concrete, glazed ceramic, metal, plastic, terra cotta, stone, fiberglass, even wood. Plastic and metal materials are capable of withstanding extreme weather variations, but surfaces can be slippery; further, some plastics crack with age and structural metals should be rust resistant. In this regard, the bath basin support reservoir or reservoir 30 may also be constructed from any number of materials. For example, as it is contemplated that basin 20 may be constructed from cement, fiberglass or similar other resin, terra cotta, ceramic materials, and the like, so too may reservoir 30 be constructed from these types of formable materials. To keep manufacturing costs at a minimum and to be consistent with basin 20, however, it is contemplated that the preferred materials comprise fiberglass or similar other resin. This type of specified material is sufficiently strong and lightweight and may be manufactured or formed inexpensively. Moreover, reservoir 30 is preferably circular in horizontal cross section and comprises an overall diameter of about 16¼ inches and a depth of about 12 inches in the preferred embodiment. Given the relatively large dimensions of reservoir 30, should the consumer desire a more massive construction, the reservoir component may tend to be rather heavy and unwieldy. While it is evident from an inspection of the various figures that reservoir 30 has a certain wall thickness, the wall thickness will depend on the desired materials used in the construction of the component. It is thus believed that the thickness of reservoir 30 is a specification which may be left to the consumer's or manufacturer's election and is not critical to the functionality of the present invention.

Figure 4:
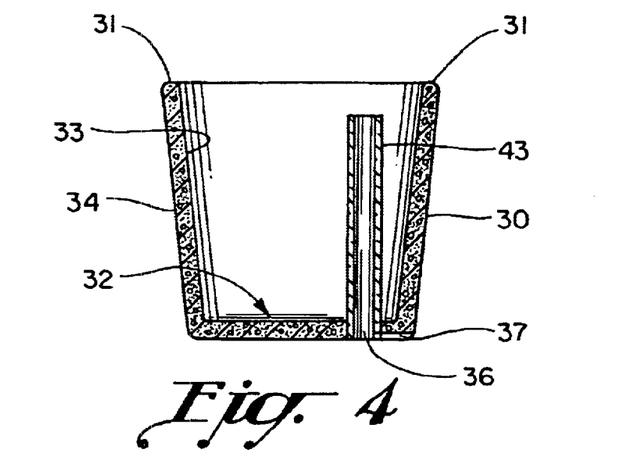
FIG. 4 is a cross-sectional side view of the reservoir and conduit member in an assembled stated.
Figure 5:
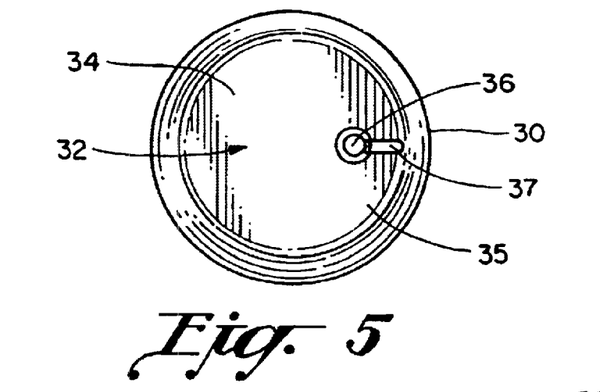
FIG. 5 is a bottom plan view of the reservoir showing the infrabasal notch.

Reservoir 30 preferably comprises a superior support perimeter or superior reservoir perimeter 31 as illustrated in FIGS. 4 and 8; an inferior reservoir base 32 as illustrated in FIGS. 4 and 5; an inner reservoir surface 33 as illustrated in FIG. 4; and an outer reservoir surface 34 as illustrated in FIGS. 4, 5, 9, and 10. It will be seen from an inspection of FIG. 8 that inferior basin surface 27 is seated atop the superior reservoir perimeter 31. While it is contemplated that basin 20 may be removably seated or seated stop superior support perimeter 31 in a readily removable fashion, it is further contemplated that the need to remove basin 20 from superior reservoir perimeter 31 is rather limited. In this regard, it is contemplated that the user may wish to occasionally reposition or reinstall birdbath—fountain assembly 10 in different locations and thus may need to disassemble birdbath—fountain assembly 10. However, maintenance of the various components of birdbath—fountain assembly 10 may be accomplished largely through the utilization of reservoir access aperture 28, thus increasing the efficiency of regular maintenance procedures.

Reservoir base 32 preferably comprises an inferior reservoir perimeter 35 as illustrated in FIG. 5; a superior base surface continuous with inner reservoir surface 33 at the basal region; an inferior base surface continuous with the outer reservoir surface 34 at the basal region; and at least one conduit aperture 36 as illustrated in FIGS. 4 and 5. Conduit aperture 36 preferably extends through the superior base surface or inner reservoir surface 33 and the inferior base surface or the outer reservoir surface 34 and is preferably located at a non-centered position in reservoir base 32 as generally illustrated in FIG. 5 so as to be adjacent the fall of water into reservoir 30 or at a point greater than 2 inches from the center of reservoir base 32. It will be understood that the geometric center of reservoir access aperture 28 is preferably aligned with the geometric center of reservoir base 32 such that the line connecting the two centers is substantially vertical. Conduit aperture 36 is included in the design to allow matter to exit the structure of reservoir 30. In this regard, it is contemplated that the inferior base surface preferably further comprises an infrabasal notch 37 as further illustrated in FIGS. 4, 5, 9 and 10. Infrabasal notch 37 preferably extends from conduit aperture 36 to inferior reservoir perimeter 35 as generally illustrated in FIG. 5 and thus provides reservoir 30 with basal conduit means for allowing matter to exit reservoir 30. In this regard, it is contemplated that conduit aperture 36 is designed to allow excess water captured by the lower reservoir to exit the lower reservoir.

Fountain assembly 40 is primarily housed within reservoir 30 as generally illustrated in FIG. 8 and essentially comprises a pump assembly 41 as illustrated in FIG. 8; a float valve assembly 42 as illustrated in FIG. 8; and a substantially vertical conduit member 43 as illustrated in FIGS. 4 and 8. Pump assembly 41 essentially comprises pump housing as referenced at 44 in FIG. 8; an upwardly extended riser or fountain tubing 45 as reference at 45 in FIG. 8; and electrical power delivery means as referenced at 46 in FIG. 8. Depending on the needs of the consumer or manufacturer it is contemplated that any number of small submersible water recirculating pumps may be utilized. The Little Giant Pump Co., P.O. Box 12010, Oklahoma City, Okla. 73157 (www.LittleGiantPump.com) offers various types of small submersible pumps, including small submersible epoxy encapsulated pumps designed for light duty water recirculation, which are ideal for statuary and water displays. For example, excellent results have been obtained using a LITTLE GIANT® brand PE-A series submersible pump. This compact 80 GPH pump features a ⅛ inch MNPT discharge, 4.5 foot shut-off head capability, screened inlet and 6 foot power cord. The PE-A is not recommended for aquariums, swimming pools and fuel oil transfer.

To function most efficiently, pump assembly 41 preferably comprises water filter means. In this last regard, it is noted that any number of filter means may successfully be utilized with the present invention. Excellent results have been obtained, for example, when a submersible pump is utilized in combination with about 1–2 inches of pea gravel or aquarium type gravel in reservoir 30, which gravel serves to filter litter from the recirculating water. Additionally, it is contemplated that reusable, readily cleanable pond filtering materials may be used in combination with the present invention. In this regard, a 1 to 2 inch wide wrap of pond filtering material may be removably secured around the pump assembly, providing further highly effective filtering means. Further, excellent results have been obtained by adding algae-deterring means to the water to maintain an algae-free water solution. In this regard, it is contemplated that nitrifying bacteria as provided from Bioverse, Inc. of 10300 Valley View Rd., Suite 107, Eden Prairie, Minn., 55344 can colonize a variety of filter media. Nitrifying bacteria break down fecal matter that can pollute water and are the food of algae. By adding nitrifying bacteria to the birdbath water solution, the water and bath remain cleaner. Two benefits of moving water as found in a recirculating birdbath of the type described herein, include the greater bird attraction capability of moving water. Secondly, mosquitoes tend not to lay eggs in moving water. In this last regard, it is further contemplated that the present invention may further be utilized with a natural mosquito larvae killer as also supplied by Bioverse, Inc.

Fountain tubing 45 is preferably constructed from ¼ inch vinyl tubing and comprises a water inlet end and a water outlet end. The water inlet end is cooperatively associated with the pump housing so as to serve as the entry point or inlet for pumped water exiting the pump housing. The tubing conveys the pumped water to the water outlet end via fountain tubing 45, which acts as a riser. Water exiting the water outlet end may do so through a spray head at the user's election. In any event, water circulates from the pump housing to the water outlet end to basin 20 to reservoir 30, which reservoir retains and recirculates the water in the described cyclic path. Water that empties into reservoir 30 from basin 20 is recirculated after preferably being filtered as described. It is noted that with the preferred dimensions of water inlet grooves 24, the user or manufacturer is enabled to utilize a variety of pumps with typically higher gallons-per-hour or liters-per-hour ratings since water is relatively free to flow throughout the system.

Float valve assembly 42 essentially comprises a float valve, float tubing, and valve control means for opening and closing the float valve. Depending on the needs of the consumer or manufacturer it is contemplated that any number of float valve assemblies may be utilized. Kerick Valve, Inc., 6842 Estrada Rd., Jacksonville, Fla., 32217 (www.floatvalve.com) offers various types of float valve assemblies that are non-corrosive, heavy-duty, high-quality PVC alternative for fluid level control. Kerick Valve, Inc. further offers PVC float valves that are a cost-effective alternative to stainless steel and the non-corrosive alternative to brass float valves. Excellent results are obtainable using a KERICK brand M252 float valve. Further, Roberts Manufacturing Co. of California offers Model No. RM64 float valves that also provide excellent results. In any case, it is recommended that the assembly comprise a 4×5 inch float ball and 6–8 inch stainless steel float rod for maximum performance. The float valve, being operated by a float and rod assembly, is thus designed to control water outlet from the float tubing, which float tubing preferably comprises ¼ inch vinyl tubing.

Conduit member 43 is preferably constructed form PVC conduit having a 2 inch outer diameter and comprises a first conduit end or superior conduit end and a second conduit end or inferior conduit end. The inferior conduit end is preferably inserted in conduit aperture 36 as illustrated in FIG. 4. Given the preferred diameter of conduit member 43, it is further contemplated that conduit aperture 36 having a measured inner diameter of about 2 inches so as to provide for a snug fit between conduit member 43 and conduit aperture 36. In this regard, it is preferable that a water tight seal be formed between conduit member 43 and conduit aperture 36 so as to prevent reservoir water from leaking between the outer surfaces of conduit member 43 and the inner surfaces of conduit aperture 36. Float valve assembly 42 is effectively attached to conduit member 43 adjacent the superior conduit end for controlling water levels in reservoir 30. As earlier stated, the float valve is operated by float and is designed to control water outlet from the float tubing. As is well known in the art, the float is cooperatively associated with the float valve such that the preferred water level is maintained. In the present invention, the water level is preferably maintained in inferior adjacency to the superior conduit end as generally illustrated in FIG. 8. It will be further understood that water emptying into reservoir 30 from basin 20 will typically not enter the superior conduit end given the off-centered placement of conduit aperture 36 as earlier described. It should be noted that the conduit member 43 allows water that rises above the height of conduit member 43 to exit the lower reservoir via conduit aperture 36. Conduit member 43 thus serves as a water overflow removal means.

It is contemplated that the water levels in reservoir 30 may fluctuate given water evaporation or use of water from basin 20. If water levels were to fall in reservoir 30 such that the float operates to open the float valve, the float tubing delivers water from a water supply to reservoir 30. Should water levels exceed the given height of the superior conduit end, for example, during heavy rainfall conditions, reservoir water will spill over the terminus of the superior conduit end and exit reservoir 30 through conduit aperture 36. It will thus be seen that conduit member 43 may also function as basal conduit means, whereby various matter may exit reservoir 30.

As is generally illustrated in FIG. 8, the float tubing preferably exits reservoir 30 via conduit member 43 and the basal conduit means as enabled by infrabasal notch 37 and as generally illustrated in FIGS. 9 and 10. The float tubing is selectively connected to a preferably pressurized water supply as is generally illustrated in FIG. 8. Similarly, the electrical power delivery means or power cord exits reservoir 30 via conduit member 43 and the basal conduit means as generally illustrated in FIGS. 9 and 10. The electrical power delivery means is selectively connected to an electrical power supply (not illustrated). It should be observed that if the pump is to be plugged into an outdoor receptacle, the receptacle should be protected with a ground fault circuit interrupter (GFCI). Preferably, the power cord is of sufficient length to allow the user to remove pump housing 44 and fountain tubing 45 from reservoir 30 through reservoir access aperture 28. In this regard, it will be understood that pump housing 44 is removably seated atop the superior base surface such that the user may simply reach into reservoir 30, grasp pump housing 44 or fountain tubing 45, and remove pump housing from the superior base surface for maintenance or inspection.

Decorative cap 50 may be described as comprising a cap for simultaneously covering reservoir access aperture 28 and providing a platform for bird gatherings. In this last regard, it is noted that birds will typically not plunge into water of an unknown depth. Decorative cap 50 thus provides birds with a convenient vantage point from which to embark on bathing or drinking activities. Decorative cap 50 is preferably constructed from the same materials as basin 20 and reservoir 30, which materials are discussed hereinabove.

Figure 6:
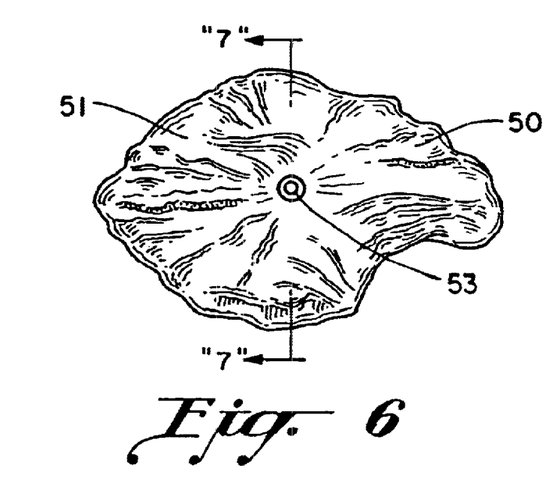
FIG. 6 is a top plan view of the decorative cap.
Figure 7:
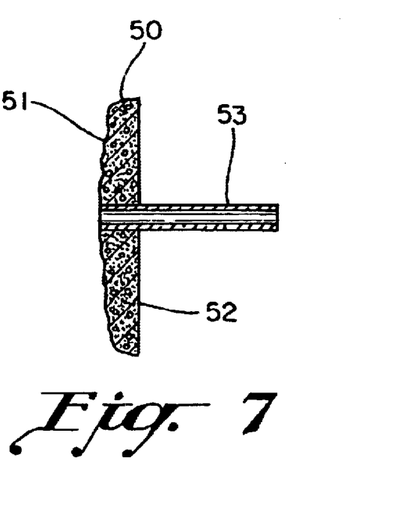
FIG. 7 is a cross-sectional side view of the decorative cap of FIG. 6.

Decorative cap 50 preferably comprises a superior cap surfaces 51 as illustrated in FIGS. 6 and 7; an inferior cap surface 52 as illustrated in FIG. 7; and a fixedly attached water outlet member or water outlet conduit 53 as illustrated in FIGS. 6, 7, and 8. In this last regard, decorative cap 50 may further comprise a water outlet aperture into which is fixedly attached water outlet conduit 53. In this case, the water outlet aperture will snugly accept water outlet conduit 53, which preferably comprises ½ inch PVC tubing. Inferior cap surface 52 is preferably of a substantially planar configuration for flush seated engagement with the coplanar cap-engaging surfaces 25 as is generally illustrated in FIG. 8. Water inlet grooves 24 are preferably configured such that the gap between the plane of cap-engaging surfaces 25 and the superior surface of each water inlet groove 24 is about ½ inch so as to enable overflow water to empty into reservoir 30 passing in inferior adjacency to inferior cap surface 52 as is generally illustrated in FIG. 8.

It will be understood that water outlet conduit 53 is in fluid communication with the water outlet end of conduit member 43 as generally illustrated in FIG. 8. It will be further understood that water outlet conduit 53 is cooperatively associated with decorative cap 50 insofar as water outlet conduit 53 preferably extends through inferior cap surface 52 and superior cap surface 51. Pumped water thus exits onto superior cap surface 51 as is generally illustrated in FIG. 8 and serves to continually refill basin 20. Preferably, superior cap surface 51 comprises decorative statuary so as to increase the visually appealing characteristics of birdbath—fountain assembly 10. In third regard, it is contemplated that any number of decorative surfaces may be developed for superior cap surface 51. For example, as generally illustrated in FIGS. 1 and 6, superior cap surface 51 is sized and shaped to appear like a flagstone. Preferably, the decorative statuary should provide a gathering place for attracted birds.

It is noted that a bird wet from bathing cannot move as quickly as a dry bird. It is therefore important to note that described birdbath—fountain assembly is preferably positioned in reasonably close proximity to foliage cover so that birds can quickly take refuge from predators. It should be further noted that the birdbath—fountain assembly should be placed on flat, level ground, but not too closely to shrubbery since cats and other marauders tend to prey upon birds from these types of locations. A location about ten to twenty feet from protective shrub cover offers a good safety zone; baths located any farther may tend to leave damp birds exposed to birds prey. Further, it is recommended that the user avoid overhanging tree branches, wood fences or flat-topped walls that could serve as launching pads for predators. It may take a few days for birds to come to the birdbath—fountain assembly. They are most vulnerable when they bathe and are usually quite cautious when approaching a new source of water. Further, it is not recommended that the birdbath—fountain assembly be used in the winter or without a heater. To store the birdbath—fountain assembly, simply drain the birdbath—fountain assembly, turn the basin upside down so that snow or rain cannot collect inside the superior basic surface, and cover with a plastic tarp or similar protective barrier.

METHOD

The present invention further discloses a novel method for maintaining a birdbath assembly, which essentially comprises the steps of (1) providing a maintenance-efficient birdbath assembly, which essentially comprises an annular bath basin, a bath basin support reservoir, water-replenishing means, and a decorative cap. The annular bath basin comprises a central basin water dam, a bath basin superior surface, and a bath basin inferior surface, the central basin water dam being integrally formed with the superior basin surface, the central basin water dam comprising at least one upwardly extending water retainer and at least one water inlet groove, the water inlet groove being opposite the water retainer, the water retainer and the water inlet groove defining a reservoir access aperture. The bath basin support reservoir comprises a superior support perimeter, an inner reservoir surface, an outer reservoir surface, the bath basin inferior surface being seated atop the superior support perimeter, the water inlet grooves allowing water to empty into the bath basin support reservoir, the reservoir access aperture being sized and shaped to allow a user to manually access the bath basin support reservoir without removing the annular bath basin from the bath basin support reservoir. The water-replenishing means essentially comprises removable components and the decorative cap essentially comprises a superior cap surface and an inferior cap surface, the interior cap surface being removably seated atop the water retainer. The method comprises further steps of (2) removing the decorative cap from the water retainer; (3) inserting an upper appendage through the reservoir access aperture; (4) removing the removable components from the bath basin support reservoir through the reservoir access aperture; (5) maintaining the removable components; (6) inserting the maintained removable components into the bath basin support reservoir through the reservoir access aperture; (7) removing the upper appendage from the maintained bath basin support reservoir through the reservoir access aperture; and (8) replacing the decorative cap atop the water retainer.

It will be seen that the present invention further provides a maintenance-efficient birdbath—fountain assembly for enabling a user to allure or attract birds to a desired location. In this regard, it will be seen that the present invention provides a combination birdbath and fountain assembly which does not require the user to remove the bath structure or basin structure from the basin-supporting pedestal in order to gain access to fountain components or the pedestal reservoir. Further, it will be seen that the present invention provides a birdbath and fountain assembly which simultaneously provides means for continually refilling the water level in the birdbath basin and a decorative statuary effect.

Specifically, it will be seen that the present invention provides a birdbath—fountain assembly comprising a basin, a reservoir, a fountain assembly and a decorative cap, which together provide an efficiently maintainable birdbath and fountain assemblage. It will thus be seen that the present invention provides a basin that comprises a superior basin perimeter, a hollow central basin pedestal, a sloped superior basin surface, and an inferior basin surface wherein the sloped superior basin surface is intermediate the superior basin perimeter and the hollow central basin pedestal; wherein the hollow central basin pedestal comprises a cap support end and a basin-engaging end; wherein the basin-engaging end is integrally formed with the sloped superior basin surface; wherein the cap support end comprises a plurality of upwardly extending equally-spaced support members and a plurality of water inlet grooves intermediate the support members; wherein the support members each have a cap-engaging surface; wherein the cap-engaging surfaces are substantially coplanar; wherein the support members and water inlet grooves define a reservoir access aperture.

Further, it will be seen that the present invention provides a reservoir that comprises a superior reservoir perimeter and an inferior reservoir base wherein the inferior basin surface of the basin may be seated atop the superior reservoir perimeter, wherein the reservoir base comprises an inferior reservoir perimeter, a superior base surface, an inferior base surface and at least one conduit aperture; wherein the conduit aperture extends through the superior base surface and the inferior base surface; wherein the inferior base surface has an infrabasal notch; wherein the infrabasal notch extends from the conduit aperture to the inferior reservoir perimeter; and wherein the infrabasal notch provides basal conduit means.

Still further, it will be seen that the present invention provides a fountain assembly which comprises a pump assembly, a float valve assembly, and a substantially vertical conduit member wherein the pump assembly comprises a pump housing, an upwardly extending fountain tubing, and electrical power delivery means; wherein the fountain tubing comprising a water inlet end and a water outlet end; wherein the water inlet end is cooperatively associated with the pump housing; wherein the float valve assembly comprises a float valve and a float tubing; wherein the float valve controls water outlet from the float tubing; wherein the conduit member comprises a superior conduit end and an inferior conduit end; wherein the inferior conduit end is inserted in the conduit aperture and forms a water tight seal therebetween; wherein the float valve assembly is attached to the conduit member adjacent the superior conduit end for controlling water levels in the reservoir; wherein the float tubing exits the reservoir via the conduit member and basal conduit means and is selectively connected to a water supply; wherein the electrical power delivery means exits the reservoir via the conduit member and basal conduit means and is selectively connected to an electrical power supply.

Lastly, it will be seen that the present invention provides a decorative cap that comprises a superior cap surface, an inferior cap surface and a water outlet conduit wherein the inferior cap surface is substantially planar for seated engagement with the cap-engaging surfaces; wherein the water outlet conduit is in fluid communication with the water outlet end and extends through the inferior cap surface and the superior cap surface; wherein the reservoir access aperture is sized and shaped to allow a user to manually access the fountain assembly or the reservoir without removing the basin from the reservoir; wherein the reservoir access aperture provides means for efficiently maintaining the birdbath—fountain assembly.

While the above description contains much specificity, this specificity should not be construed as limitations on the scope of the invention, but rather as an exemplification of the invention. For example, it is contemplated that the support members and water inlet grooves need not number four. It is contemplated that at least one support member and at least one water inlet groove opposite the support member may function to empty water into the water reservoir in a fashion that it not patentably distinct from a structure comprising four support member and four water inlet grooves. In this regard, the one support member should comprise an arc length greater than one-half the circumference of the reservoir access aperture, preferably two-thirds to three-quarters the circumference so as to simultaneously provide ample support for the decorative cap while allowing overflow water to empty into the reservoir through the water inlet groove.

Further, it is contemplated that the birdbath—fountain assembly is essentially constructed from a novel birdbath assembly comprising an upper annular basin and a lower bath basin support reservoir wherein the annular bath basin essentially comprises a central basin water dam, a bath basin superior surface, and a bath basin inferior surface. The central basin water dam is integrally formed with the bath basin superior surface and comprises at least one upwardly extending water retainer and at least one water inlet groove opposite the water retainer as described above. Preferably, however, the bath basin superior surface should comprise at least two water retainers and at least two water inlet grooves intermediate the water retainers. The water retainers and the water inlet grooves thus define a reservoir access aperture. The bath basin support reservoir essentially comprises a superior support perimeter, an inner reservoir surface and an outer reservoir surface wherein the bath basin inferior surface is seated atop the superior support perimeter. The water inlet grooves thus allow water to empty into the bath basin support reservoir and the reservoir access aperture is sufficiently sized and shaped to allow a user to manually access the bath basin support reservoir (and/or the pump assembly and/or the filter means) without removing the annular bath basin from the bath basin support reservoir. In other words, it is contemplated that the unique structure may serve to function as a birdbath without the fountain assembly or decorative cap components in its most basic form. Water may be poured or gathered into the upper annular basin from manual labor, rainfall or other means and excess water may empty into the lower reservoir structure via the water inlet grooves. Users may readily gain access to the lower reservoir via the reservoir access aperture to maintain the lower reservoir. Further, should the user so desire, the lower reservoir may comprise a conduit aperture for allowing excess water captured by the lower reservoir to exit the lower reservoir. A decorative cap may then be utilized to cap off the present invention and water-replenishing means may be installed to maintain a constant water supply.

Accordingly, although the invention has been described by reference to a preferred embodiment, it is not intended that the novel assembly be limited thereby, but that modifications thereof are intended to be included as falling within the broad scope and spirit of the foregoing disclosure, the following claims and the appended drawings.

I claim:

1. A maintenance-efficient birdbath—fountain assembly, the birdbath—fountain assembly comprising in combination:

a basin, the basin comprising a superior basin perimeter, a hollow central basin pedestal, a sloped superior basin surface, and an inferior basin surface, the sloped superior basin surface being intermediate the superior basin perimeter and the hollow central basin pedestal, the hollow central basin pedestal comprising a cap support end and a basin-engaging end, the basin-engaging end being integrally formed with the sloped superior basin surface, the cap support end comprising a plurality of upwardly extending equally-spaced support members and a plurality of water inlet grooves, the water inlet grooves being intermediate the support members, the support members each having a cap-engaging surface, the cap-engaging surfaces being substantially coplanar, the support members and water inlet grooves defining a reservoir access aperture;

a reservoir, the reservoir comprising a superior reservoir perimeter and an inferior reservoir base, the inferior basin surface being seated atop the superior reservoir perimeter, the inferior reservoir base comprising an inferior reservoir perimeter, a superior base surface, an inferior base surface and at least one conduit aperture, the conduit aperture extending through the superior base surface and the inferior base surface, the inferior base surface comprising an infrabasal notch, the infrabasal notch extending from the conduit aperture to the inferior reservoir perimeter, the infrabasal notch for providing basal conduit means;

a fountain assembly, the fountain assembly comprising a pump assembly, a float valve assembly, and a substantially vertical conduit member, the pump assembly comprising a pump housing, upwardly extending fountain tubing, and electrical power delivery means, the fountain tubing comprising a water inlet end and a water outlet end, the water inlet end cooperatively associated with the pump housing, the float valve assembly comprising a float valve, valve control means, and float tubing, the float valve and valve control means for controlling water outlet from the float tubing, the conduit member comprising a superior conduit end and an inferior conduit end, the inferior conduit end being inserted in the conduit aperture to form a water tight seal therebetween, the float tubing exiting the reservoir via the conduit member and basal conduit means, the float tubing being selectively connected to a water supply, the electrical power delivery means exiting the reservoir via the conduit member and basal conduit means, the electrical power delivery means being selectively connected to an electrical power supply; and a decorative cap, the decorative cap comprising a superior cap surface, an inferior cap surface and a water outlet conduit, the inferior cap surface being substantially planar for seated engagement with the cap-engaging surfaces, the water outlet conduit being in fluid communication with the water outlet end and extending through the inferior cap surface and the superior cap surface, the reservoir access aperture being sized and shaped to allow a user to manually access the fountain assembly without removing the basin from the reservoir, the reservoir access aperture thus providing means for efficiently maintaining the birdbath—fountain assembly.

2. The maintenance-efficient birdbath—fountain assembly of claim 1 wherein the electrical power delivery means is defined by a power cord, the power cord being of sufficient length to allow the user to remove the pump housing and fountain tubing from the reservoir through the reservoir access aperture.

3. The maintenance-efficient birdbath—fountain assembly of claim 2 wherein the reservoir access aperture is sized and shaped to allow an adult user to reach into the reservoir, the adult user thus being able manually access the fountain assembly with an upper appendage.

4. The maintenance-efficient birdbath—fountain assembly of claim 1 wherein the hollow central basin pedestal comprises a substantially circular horizontal cross-section.

5. The maintenance-efficient birdbath—fountain assembly of claim 4 wherein the reservoir access aperture comprises a cross-sectional diameter, the cross-sectional diameter being about 4 inches.

6. The maintenance-efficient birdbath—fountain assembly of claim 5 wherein the plurality of upwardly extending equally-spaced support members number four and the plurality of water inlet grooves intermediate the support members number four, the support members and water inlet grooves each comprising an arc length, each arc length comprising about ⅛ the circumference of the substantially circular horizontal cross-section.

7. The maintenance-efficient birdbath—fountain assembly of claim 6 wherein the superior cap surface comprises decorative statuary.

8. A maintenance-efficient birdbath assembly, the birdbath assembly comprising in combination:

a basin, the basin comprising a superior basin perimeter, a hollow central basin pedestal, a sloped superior basin surface, and an inferior basin surface, the sloped superior basin surface being intermediate the superior basin perimeter and the hollow central basin pedestal, the hollow central basin pedestal comprising a cap support end and a basin-engaging end, the basin-engaging end being integrally formed with the sloped superior basin surface, the cap support end comprising a plurality of upwardly extending equally-spaced support members and a plurality of water inlet grooves intermediate the support members, the support members each having a cap-engaging surface, the cap-engaging surfaces being substantially coplanar, the support members and water inlet grooves defining a reservoir access aperture;

a reservoir, the reservoir comprising a superior reservoir perimeter surface, an inner reservoir surface and an outer reservoir surface, the inferior basin surface being seated atop the superior reservoir perimeter surface; and a decorative cap, the decorative cap comprising a superior cap surface and an inferior cap surface, the inferior cap surface being substantially planar for seated engagement with the cap-engaging surfaces, the reservoir access aperture being sized and shaped to allow a user to manually access the reservoir without removing the basin from the reservoir, the reservoir access aperture thus providing means for efficiently maintaining the birdbath assembly.

9. The maintenance-efficient birdbath assembly of claim 8 wherein the reservoir access aperture is sized and shaped to allow an adult user to reach into the reservoir, the adult user thus being able manually access the reservoir with an upper appendage.

10. The maintenance-efficient birdbath assembly of claim 8 wherein the hollow central basin pedestal comprises a substantially circular horizontal cross-section.

11. The maintenance-efficient birdbath assembly of claim 10 wherein the reservoir access aperture comprises a cross-sectional diameter, the cross-sectional diameter being about 4 inches.

12. The maintenance-efficient birdbath assembly of claim 8 wherein the plurality of upwardly extending equally-spaced support members number four and the plurality of water inlet grooves intermediate the support members number four, the support members and water inlet grooves each comprising an arc length, each arc length comprising about ⅛ the circumference of the substantially circular horizontal cross-section.

13. The maintenance-efficient birdbath of claim 12 wherein the superior cap surface comprises decorative statuary.

14. The maintenance-efficient birdbath assembly of claim 8 wherein the birdbath assembly further comprises a fountain assembly, the fountain assembly comprising a pump assembly, a float valve assembly, and a substantially vertical conduit member, the pump assembly comprising a pump housing, upwardly extending fountain tubing, and electrical power delivery means, the fountain tubing comprising a water inlet end and a water outlet end, the water inlet end cooperatively associated with the pump housing, the float valve assembly comprising a float valve, valve control means, and float tubing, the float valve and valve control means for controlling water outlet from the float tubing, the conduit member comprising a superior conduit end and an inferior conduit end, the inferior conduit end being inserted in a conduit aperture, the conduit aperture extending through the inner reservoir surface and the outer reservoir surface, the inferior conduit end and the conduit aperture having a water tight seal therebetween, the float tubing exiting the reservoir via the conduit member, the float tubing being selectively connected to a water supply, the electrical power delivery means exiting the reservoir via the conduit member, the electrical power delivery means being selectively connected to an electrical power supply; the water outlet end being in fluid communication with a water outlet conduit, the water outlet conduit extending through the inferior cap surface and the superior cap surface.

15. The maintenance-efficient birdbath assembly of claim 14 wherein the electrical power delivery means is defined by a power cord, the power cord being of sufficient length to allow the user to remove the pump housing and fountain tubing from the reservoir through the reservoir access aperture.

16. The maintenance-efficient birdbath assembly of claim 14 wherein the reservoir comprises a reservoir base, the reservoir base comprising an inferior reservoir perimeter and an infrabasal notch, the infrabasal notch extending from the conduit aperture to the inferior reservoir perimeter, the infrabasal notch for providing basal conduit means, the float tubing exiting the reservoir via the conduit member and the basal conduit means, the electrical power delivery means exiting the reservoir via the conduit member and the basal conduit means.

17. A maintenance-efficient birdbath assembly, the birdbath assembly comprising in combination:
  a basin, the basin comprising a hollow central basin pedestal, a superior basin surface, and an inferior basin surface, the hollow central basin pedestal comprising a cap support end and a basin-engaging end, the basin-engaging end being integrally formed with the superior basin surface, the cap support end comprising a plurality of upwardly extending equally-spaced support members and a plurality of water inlet grooves intermediate the support members, the support members and water inlet grooves defining a reservoir access aperture,
  a reservoir, the reservoir comprising a superior reservoir perimeter surface, an inner reservoir surface and an outer reservoir surface, the inferior basin surface being seated atop the superior reservoir perimeter surface; and
  a decorative cap, the decorative cap comprising a superior cap surface and an inferior cap surface, the inferior cap surface for seated engagement with the cap-engaging surfaces, the reservoir access aperture being sized and shaped to allow a user to manually access the reservoir without removing the basin from the reservoir, the reservoir access aperture thus providing means for efficiently maintaining the birdbath assembly.

18. The maintenance-efficient birdbath assembly of claim 17 wherein the hollow central basin pedestal comprises a substantially circular horizontal cross-section.

19. The maintenance-efficient birdbath assembly of claim 18 wherein the reservoir access aperture comprises a cross-sectional diameter, the cross-sectional diameter being about 4 inches.

20. The maintenance-efficient birdbath assembly of claim 17 wherein the plurality of upwardly extending equally-spaced support members number at least two and the plurality of water inlet grooves number at least two.

21. The maintenance-efficient birdbath assembly of claim 20 wherein the superior basin perimeter is coplanar with the cap-engaging surfaces.

22. The maintenance-efficient birdbath of claim 17 wherein the superior cap surface comprises decorative statuary.

23. The maintenance-efficient birdbath assembly of claim 17 wherein the birdbath assembly further comprises a fountain assembly, the fountain assembly comprising a pump assembly, a float valve assembly, and basal conduit means, the pump assembly comprising a pump housing, fountain tubing, and electrical power delivery means, the fountain tubing comprising a water inlet end and a water outlet end, the water inlet end cooperatively associated with the pump housing, the float valve assembly comprising a float valve, valve control means, and float tubing, the float valve and valve control means for controlling water outlet from the float tubing, the basal conduit means comprising a first conduit end and an second conduit end, the second conduit end being inserted in a conduit aperture, the conduit aperture extending through the inner reservoir surface and the outer reservoir surface, the float tubing exiting the reservoir via the basal conduit means, the float tubing being selectively connected to a water supply, the electrical power delivery means exiting the reservoir via the basal conduit means, the electrical power delivery means being selectively connected to an electrical power supply; the water outlet end being in fluid communication with a water outlet member, the water outlet member being cooperatively associated with the decorative cap.

24. The maintenance-efficient birdbath assembly of claim 23 wherein the reservoir comprises a reservoir base, the reservoir base comprising an inferior reservoir perimeter and an infrabasal notch, the infrabasal notch extending from the conduit aperture to the inferior reservoir perimeter, the infrabasal notch cooperatively associated with the basal conduit means, the float tubing exiting the reservoir via the infrabasal notch and the basal conduit means, the electrical power delivery means exiting the reservoir via the infrabasal notch and the basal conduit means.

25. The maintenance-efficient birdbath assembly of claim 21 wherein the bath basin support reservoir is defined by a conduit aperture extending from the inner reservoir surface to the outer reservoir surface, the conduit aperture allowing water to exit the bath basin support reservoir.

26. The maintenance-efficient birdbath assembly of claim 21 wherein the bath basin superior surface is sloped.

27. The maintenance-efficient birdbath assembly of claim 21 wherein the birdbath assembly comprises water-replenishing means.

28. The maintenance-efficient birdbath assembly of claim 21 wherein the birdbath assembly comprises a decorative cap, the decorative cap comprising a superior cap surface and an inferior cap surface, the inferior cap surface being removably seated atop the water retainer.

29. A maintenance-efficient birdbath assembly, the maintenance-efficient birdbath assembly comprising:
- an annular bath basin, the annular bath basin comprising a central basin water dam, a bath basin superior surface, and a bath basin inferior surface, the central basin water dam being integrally formed with the superior basin surface, the central basin water dam comprising at least one upwardly extending water retainer and at least one water inlet groove, the water inlet groove being opposite the water retainer, the water retainer and the water inlet groove defining a reservoir access aperture; and,
- a bath basin support reservoir, the bath basin support reservoir comprising a superior support perimeter, an inner reservoir surface, an outer reservoir surface, the bath basin inferior surface being seated atop the superior support perimeter, the water inlet grooves allowing water to empty into the bath basin support reservoir, the reservoir access aperture being sized and shaped to allow a user to manually access the bath basin support reservoir without removing the annular bath basin from the bath basin support reservoir, the reservoir access aperture thus providing means for efficiently maintaining the birdbath assembly.

30. A method of maintaining a birdbath assembly, the method of maintaining a birdbath assembly comprising the steps of:
- providing a maintenance-efficient birdbath assembly, the maintenance-efficient birdbath assembly comprising:
  - an annular bath basin, the annular bath basin comprising a central basin water dam, a bath basin superior surface, and a bath basin inferior surface, the central basin water dam being integrally formed with the superior basin surface, the central basin water dam comprising at least one upwardly extending water retainer and at least one water inlet groove, the water inlet groove being opposite the water retainer, the water retainer and the water inlet groove defining a reservoir access aperture;
  - a bath basin support reservoir, the bath basin support reservoir comprising a superior support perimeter, an inner reservoir surface, an outer reservoir surface, the bath basin inferior surface being seated atop the superior support perimeter, the water inlet grooves allowing water to empty into the bath basin support reservoir, the reservoir access aperture being sized and shaped to allow a user to manually access the bath basin support reservoir without removing the annular bath basin from the bath basin support reservoir;
  - water-replenishing means, the water-replenishing means comprising removable components;
  - a decorative cap, the decorative cap comprising a superior cap surface and an inferior cap surface, the inferior cap surface being removably seated atop the water retainer;
- removing the decorative cap from the water retainer;
- inserting an upper appendage through the reservoir access aperture;
- removing the removable components from the bath basin support reservoir through the reservoir access aperture;
- maintaining the removable components;
- inserting the maintained removable components into the bath basin support reservoir through the reservoir access aperture;
- removing the upper appendage from the maintained bath basin support reservoir through the reservoir access aperture; and
- replacing the decorative cap atop the water retainer.

31. A method of maintaining a birdbath assembly, the method of maintaining a birdbath assembly comprising the steps of:
- providing a maintenance-efficient birdbath assembly, the maintenance-efficient birdbath assembly comprising:
  - an annular bath basin, the annular bath basin comprising a central basin water dam, a bath basin superior surface, and a bath basin inferior surface, the central basin water dam being integrally formed with the superior basin surface, the central basin water dam comprising at least one upwardly extending water retainer and at least one water inlet groove, the water inlet groove being opposite the water retainer, the water retainer and the water inlet groove defining a reservoir access aperture;
- a bath basin support reservoir, the bath basin support reservoir comprising a superior support perimeter, an inner reservoir surface, an outer reservoir surface, the bath basin inferior surface being seated atop the superior support perimeter, the water inlet grooves allowing water to empty into the bath basin support reservoir, the reservoir access aperture being sized and shaped to allow a user to manually access the bath basin support reservoir without removing the annular bath basin from the bath basin support reservoir;
- inserting an upper appendage through the reservoir access aperture;
- maintaining the bath basin support reservoir with the upper appendage; and
- removing the upper appendage from the maintained bath basin support reservoir through the reservoir access aperture.

32. The method of maintaining a maintenance-efficient birdbath assembly of claim 31 wherein the birdbath assembly comprises a decorative cap, the decorative cap comprising a superior cap surface and an inferior cap surface, the inferior cap surface being removably seated atop the water retainer.

33. The method of maintaining a maintenance-efficient birdbath assembly of claim 32 wherein the method comprises additional steps, the additional steps comprising:
- removing the decorative cap from the water retainer before inserting the upper appendage through the reservoir access aperture; and,
- replacing the decorative cap atop the water retainer after removing the upper appendage from the maintained bath basin support reservoir through the reservoir access aperture.

34. The method of maintaining a maintenance-efficient birdbath assembly of claim 33 wherein the bath basin support reservoir comprises water-replenishing means, the water-replenishing means comprising removably components.

35. The method of maintaining a maintenance-efficient birdbath assembly of claim 34 wherein the method comprises additional steps after inserting the upper appendage through the reservoir access aperture, the additional steps comprising:
- removing the removable components from the bath basin support reservoir through the reservoir access aperture;
- maintaining the removable components; and
- inserting the maintained removable components into the bath basin support reservoir through the reservoir access aperture.

* * * * *